Sept. 1, 1953 P. L. SCHNEIDER 2,650,534
AIR CIRCULATING APPARATUS
Filed Dec. 1, 1949
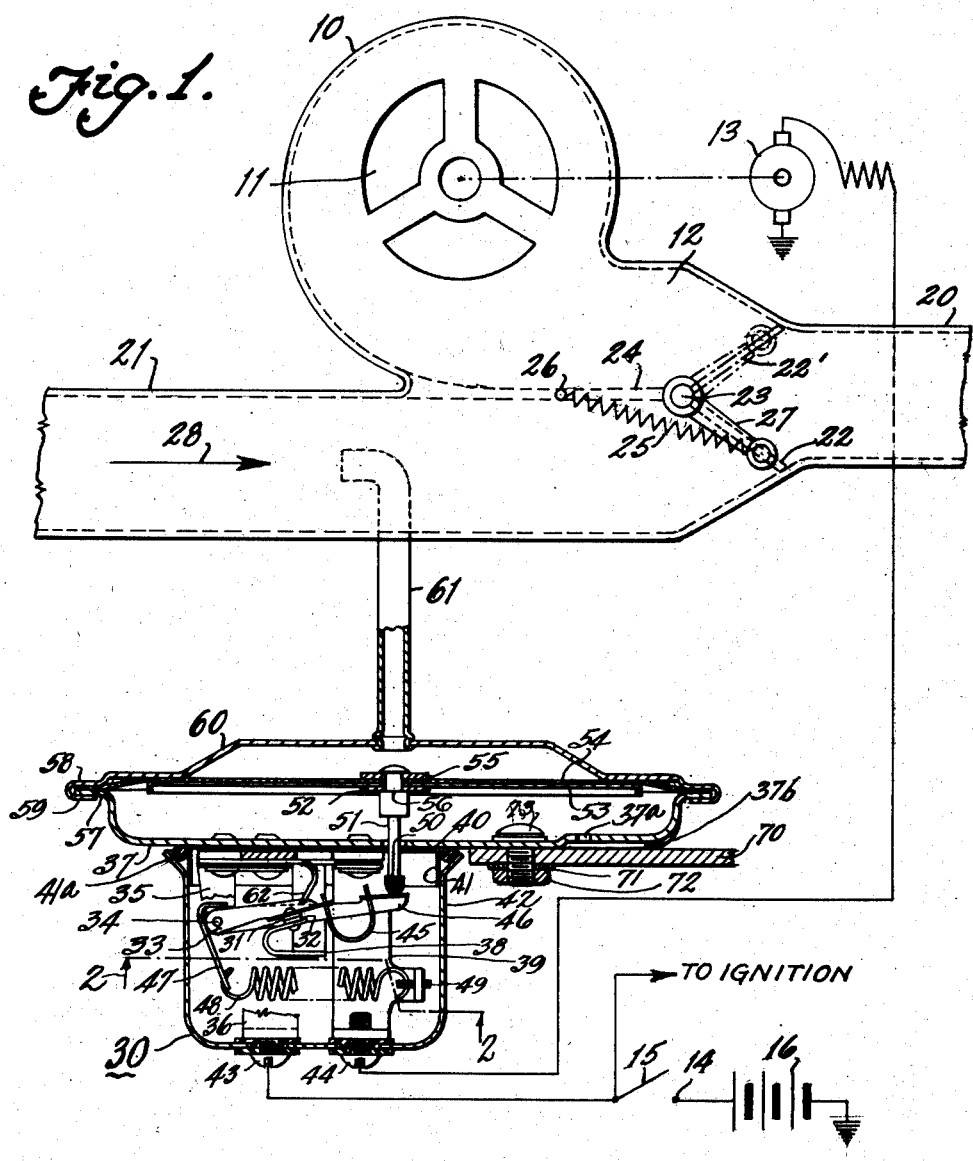
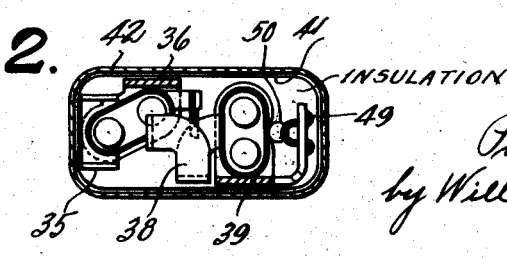
Inventor
Paul L. Schneider
by Willits, Hardman & Fehr
his attorneys Patented Sept. 1, 1953

2,650,534

UNITED STATES PATENT OFFICE 2,650,534

AIR CIRCULATING APPARATUS

Paul L. Schneider, Anderson, Ind., assignor to General Motors Corporation, Detroit, Mich., a corporation of Delaware Application December 1, 1949, Serial No. 130,402

2 Claims. (Cl. 98—2)

1

This invention relates to heating and ventilating systems for motor cars which provide for the circulation of air in the passenger compartment either by the use of a power driven blower or by air taken in from the front of the car.

One of the chief criticisms of the heating and ventilating systems for motor cars which take outside air from the front of the car is the introduction of air considerably contaminated by exhaust gases from other vehicles into the car. This condition is most serious when the car is being driven at relatively low speeds, or is standing, where congested traffic conditions exist.

One of the advantages of taking the air for the heating and ventilating system from the front of the car is that the use of a power driven blower is not required when the car is being driven at moderate speeds or faster. However, the use of the power driven blower is required to force enough outside air into the car to keep the windows from fogging when the car is being driven at low speeds or is standing. Consequently, the blower could be arranged to take air from a region of relatively low contamination and thus reduce the hazard involved when driving in congested traffic.

An object of this invention is to take advantage of the entrance of air into the heating and ventilating system of the car by impact pressure when the car is driven at higher speeds and to provide for a shift in the place of entrance of the air when the blower is required, so that the entrance of badly contaminated air into the car is avoided.

In the embodiment of the invention the air pipe leading to the interior of the body is connected by valve either with a duct leading from the front of the vehicle or with the outlet of a blower, said valve being moved automatically to block the outlet of the blower when air pressure in the duct is sufficient, or to block the duct in response to the operation of the blower which is effected automatically when air pressure in the duct is insufficient.

Further objects and advantages of the present invention will be apparent from the following description, reference being had to the accompanying drawing, wherein a preferred embodiment of the present invention is clearly shown.

In the drawing:

Fig. 1 is a diagram of the embodiment of the invention, the air pressure controlled switch controlling the blower motor circuit being shown in sections.

Fig. 2 is a sectional view on line 2—2 of Fig. 1, with certain parts omitted.

2

Referring to Fig. 1, 10 represents a casing having air inlets 11 and an outlet 12. The casing encloses a blower which is driven by an electric motor 13 connected with a current source terminal 14 by the ignition switch 15 and by an automatic switch 30. The current source may be a storage battery 16, or the generator (not shown) which charges the battery. The pipe 20, which leads to the air circulating system of the automobile body, is connected either with the blower outlet 12 or with an air inlet duct 21 which is connected with a louvre opening at the front end of the automobile. The air supplied to the outlet 12 enters the inlets 11 which are positioned in a region around the car where the air is of relative low contamination by exhaust gas of adjacent vehicles, for example the inlets may be in a region under the hood of the car or in the right fender of the car. The connection of pipe 20 either with blower outlet 12 or duct 21 is controlled by a valve 22 attached to a shaft 23 pivotally supported by a wall 24 which separates the blower outlet 12 and the duct 21. As shown in Fig. 1, the valve 22 is in position blocking duct 21 and opening blower outlet 12. Valve 22 is retained in this position by a spring 25 attached to a stud 26 supported by partition 24 and to a lever 27 attached to shaft 23 on the exterior of the housing 10. The spring is so arranged with respect to the post 26 and the lever 27 that the line of spring force passes through the pivot point bar of the shaft 23. Thus the spring will impart snap motion to the valve 22 when the line of spring force is moved to either side of a dead-center position. When the ignition switch 15 is closed, the blower motor 13 begins to run, forcing air into the car body through duct 20. This produces a certain amount of air pressure in this duct which assists the spring 25 in holding valve 22 in position, blocking duct 21. As the vehicle speed increases, pressure in duct 21 in direction of arrow 28 and in the pipe 61 increases until it reaches a value sufficient to effect the opening of the normally closed switch in unit 30. The motor 13 will then be disconnected from the current source, and the blower will stop. Air pressure in duct 20 then drops, allowing the air pressure in duct 21 to move valve 22 against spring 25 so the valve moves to position 22'. When this change occurs, pressure in duct 20 is sufficient for proper circulation of air into the vehicle body without the use of the blower.

When car speed falls below a value, such that the air pressure in duct 21 is insufficient to maintain proper circulation of air through pipe 20 to the car body, the switch in the unit 30 will be permitted to close automatically to effect connection of motor 13 with the current source and the blower 10 will operate and the pressure of air in the blower outlet 12 will be sufficient to cause the valve 22 to return from position 22' to the position blocking duct 21 and fully opening outlet 12.

The switch unit 30 comprises a contact 31 normally engaging a contact 32. Contact 31 is carried by a lever 33 pivoted on a pin 34 mounted in suitable openings in a pair of spaced depending arms 35a of a bracket 35. The bracket 35 is electrically connected with a bracket 36, said brackets 35 and 36 being insulated from a base 37. The brackets 35 and 36 are attached to the base 37 by rivets 75. The rivets are suitably insulated from the brackets 35 and 36. Contact 32 supported by a bracket 38 is electrically connected with a bracket 39, said brackets 38 and 39 being supported by the base 37 and insulated therefrom and from the brackets 35 and 36. The base 37 supports a plate 40 having a flange 41 received within a cover 42 which is attached to brackets 36 and 39 by screws 43 and 44 which are insulated from the cover 42 and which provide respectively for connection with wires connected with switch 15 and motor 13. Ring 41a provides a seal to prevent entrance of dirt into the switch case 42.

The contact 31 is biased into engagement with contact 32 by a U-spring 45, one branch of which is connected with lever 33 and the other with a U-shaped lever 46 which straddles the arm 33. The arms have suitable openings to receive the pin 34 so that it is also pivotally supported by the pin 34. Lever 46 has an extension 47 connected by a spring 48 with a non-conducting clip 49 attached to bracket 39. Spring 48 urges lever 46 counterclockwise into engagement with a non-conducting thimble 50 attached to a rod 51 passing through the base 37 and through a washer 52, a flanged disc 53, a diaphragm 54, and a washer 55. The rod is riveted over to clamp the parts 52—55 against a shoulder 56 of rod 51. The periphery of diaphragm 54 is clamped between the flange 57 of base 37 and the flange 58 of a cover 60, said flange 58 being bent around at 59 against the flange 57. Cover 60 provides together with the diaphragm 54 an air pressure chamber connected with a pipe 61 which extends within the duct 21 and which is bent to face toward the air current indicated by arrow 28. Normally the spring 45 is in such position with respect to its connection with levers 33 and 46 that its plane will be located below the axis of pivot pin 34 so that the lever 33 is normally urged clockwise. When car speed attains the value such that the pressure of air in duct 21 moving in the direction of arrow 29 is adequate for proper circulation of air in the car body, the pressure on the diaphragm 54 will become sufficient to overcome the spring 48. Therefore lever 46 will move clockwise to such a distance that the center line of action of spring 45 passes above the axis of pin 34 thereby causing the lever 33 to move counterclockwise until it strikes a stop 62 attached to base 37 and insulated therefrom. Therefore contact 31 separates from contact 32 and the current source is disconnected from the motor 13 and the blower 10 stops.

The switch unit 30 is supported by a bracket 70 to which the base 37 is attached by studs 73 arranged to pass through holes in the bracket and receiving nuts 72 and lock washers 71. The vent 37a in base 37 for the diaphragm chamber connects with a passage 37b formed by a groove 37c located next to bracket 70 when base 37 is attached thereto. This arrangement prevents dirt passing freely through the vent into the diaphragm chamber. The vent 37a so restricts the flow of air out from or into the diaphragm chamber as the diaphragm moves that surging of the switching action is minimized.

While the embodiment of the present invention as herein disclosed, constitutes a preferred form, it is to be understood that other forms might be adopted.

What is claimed is as follows:

1. An air circulating apparatus comprising a pipe connected with a compartment; a pair of ducts connected at junction with the pipe; a blower connected to one of the ducts and the other duct of said ducts being subjected to flow of air in response to forward movement of said duct; a valve pivotally mounted at the junction of the ducts, said valve normally closing the first duct and operable to open the first duct and close the second duct; a lever connected to the valve; an over-center tension spring having its ends connected respectively to said lever and a stationary part whereby said lever can be moved to snap the valve from one position to another position; switch means supported exteriorly of the ducts and pipe to control the blower; and a diaphragm control device operatively connected in said other duct by means of a Pitot tube having one end positioned with said other duct for actuating the switch means to open position when air flow pressure in said other duct reaches a predetermined position to render the blower inoperative.

2. An air circulating apparatus comprising a pipe connected with a compartment; a pair of ducts connected at junction with the pipe; a blower connected to one of the ducts and the other duct of said ducts being subjected to flow of air in response to forward movement of said duct; a valve pivotally mounted at the junction of the ducts, said valve normally closing the first duct and operable to open the first duct and close the second duct; a lever connected to the valve; an over-center tension spring having its ends connected respectively to said lever and a stationary part whereby said lever can be moved to snap the valve from one position to another position; switch means supported exteriorly of the ducts and pipe to control the blower; diaphragm control device externally located of said ducts and pipe and having an operating member disposed in said other duct for actuating the switch means to open position when air pressure in said other duct reaches a certain value to render blower inoperative.

PAUL L. SCHNEIDER.

References Cited in the file of this patent

UNITED STATES PATENTS

| Number | Name | Date |
| --- | --- | --- |
| 1,990,753 | Rapp | Feb. 12, 1935 |
| 2,032,572 | Hammers et al. | Mar. 3, 1936 |
| 2,257,967 | Le Febre et al. | Oct. 7, 1941 |